United States Patent [19]
Downing

[11] 3,836,699
[45] Sept. 17, 1974

[54] INSULATED ELECTRICAL CONNECTION

[75] Inventor: Kenneth G. Downing, San Marcos, Tex.

[73] Assignee: Thermon Manufacturing Company, San Marcos, Tex.

[22] Filed: Sept. 10, 1973

[21] Appl. No.: 395,531

Related U.S. Application Data

[63] Continuation of Ser. No. 226,769, Feb. 16, 1972, abandoned.

[52] U.S. Cl.................... 174/87, 29/628, 174/71 R, 174/92, 174/88 R, 219/528, 338/214, 339/208
[51] Int. Cl........................................... H02g 15/08
[58] Field of Search......... 174/84 R, 84 S, 87, 88 S, 174/88 R, 94 R, 90, 138 F, 74 R, 74 A, 71 R, 72 R, 91–93; 156/49; 29/628, 630 F; 339/98, 99, 201, 208; 219/528, 529

[56] References Cited
UNITED STATES PATENTS
1,238,885   9/1917   Chmela................................ 174/92

| | | | |
|---|---|---|---|
| 1,488,636 | 4/1924 | Geiser................................... | 339/98 |
| 3,315,220 | 4/1967 | Flanagan........................ | 339/275 R |
| 3,441,658 | 4/1969 | Stark et al......................... | 174/88 R |

FOREIGN PATENTS OR APPLICATIONS
954,600   6/1949   France.............................. 174/84 S Primary Examiner—Darrell L. Clay
Attorney, Agent, or Firm—Pravel, Wilson & Matthews

[57] ABSTRACT

An electrical connector for connecting electrical conductors, which have been joined by soldering splicing or other means, including first and second insulation members having grooves therein for receiving the joined conductors between said members; and, a sleeve slidably mounted about said insulation members, the sleeve being crimped to secure the insulation members about the joined conductors.

4 Claims, 3 Drawing Figures

PATENTED SEP 17 1974 3,836,699
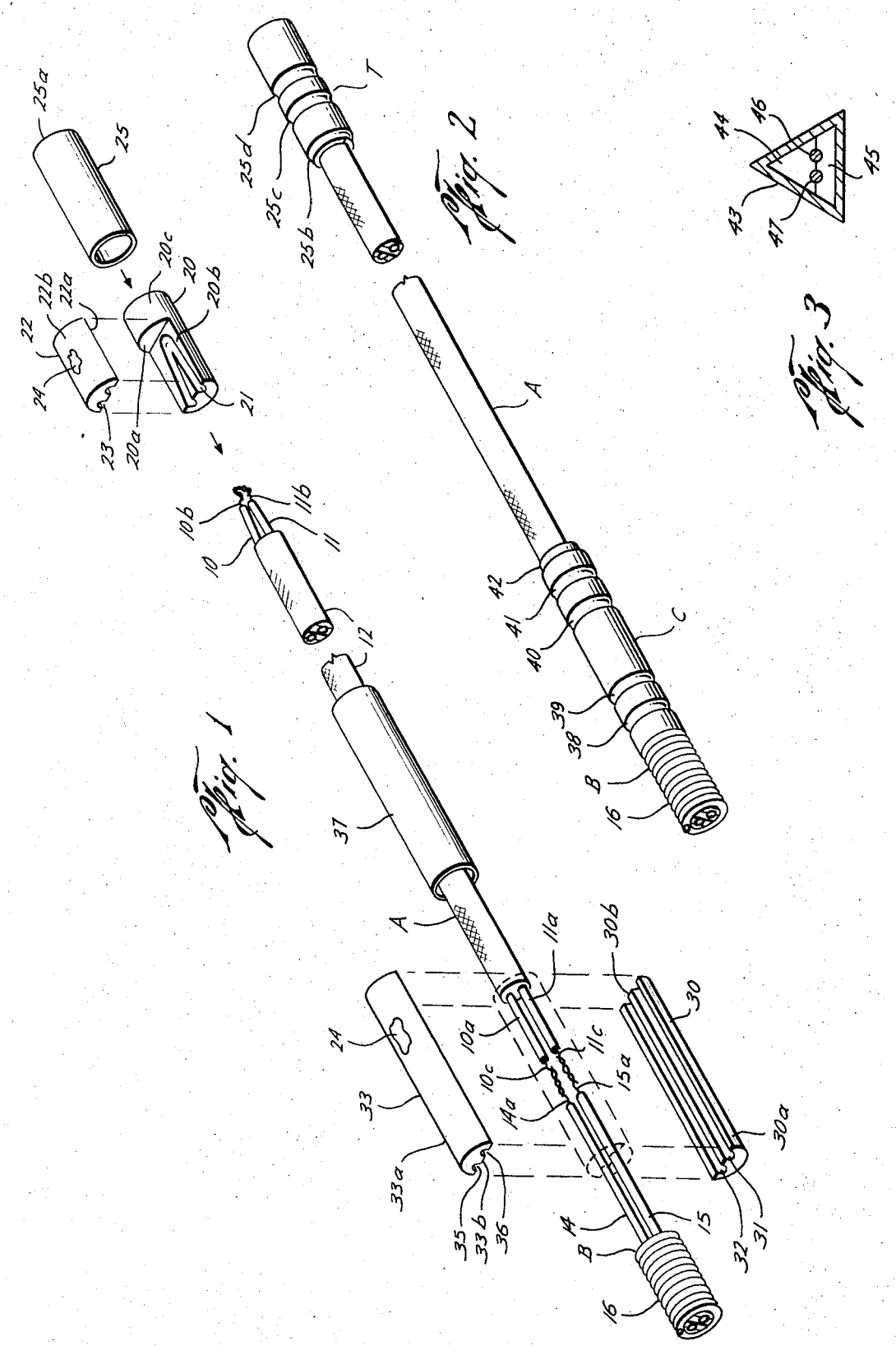

INSULATED ELECTRICAL CONNECTION

CROSS-REFERENCE TO RELATED APPLICATIONS

This application is a continuation of U.S. Pat. application Ser. No. 226,769, filed Feb. 16, 1972, now abandoned.

BACKGROUND OF THE INVENTION

The field of this invention is electrical connectors for connecting electrical conductors.

In making electrical connections between electrical conductors, the insulation must be stripped off the ends of the conductors to expose the conductors for joining by any suitable means such as twisting, soldering or splicing. After the exposed conductors are joined, they are usually covered by tape or by an electrical connector.

Various attempts have been made to devise a satisfactory electrical connector for securing and protecting such joined wires, examples of which are found in U.S. Pat. No. Re. 24,074 and No. 3,214,571.

SUMMARY OF THE INVENTION

The present invention relates to a new and improved electrical connector which both effectively insulates and secures electrical conductors very firmly together so that they cannot be "shorted out" or disassembled unintentionally. The electrical connector according to this invention preferably includes first and second insulating members having matched grooves therein for receiving joined electrical conductors over which insulating members and a sleeve are slidably mounted to secure the conductors in the grooves. The sleeve is crimped or otherwise deformed to lock the insulating members together so that the conductors cannot be pulled out of the grooves in spite of receiving pulling stress thereon or outside blows from handling.

In one embodiment of this invention, the matched grooves in the insulating members are substantially V-shaped to receive a substantially V-shaped termination connection of two conductors; and, in another embodiment the insulating members have matched parallel grooves for receiving adjacently positioned joined conductors.

BRIEF DESCRIPTION OF THE DRAWINGS

FIG. 1 is a perspective view of the electrical conductors of this invention prior to assembly;

FIG. 2 is a perspective view of the electrical connectors of this invention after assembly; and FIG. 3 is a cross sectional view of another embodiment of this invention.

DESCRIPTION OF THE PREFERRED EMBODIMENT

Referring to the drawing, the letter A generally designates a cable which includes insulated conductors 10 and 11. The conductors 10 and 11 are individually insulated by rubberized jackets 10a and 11a; and, both conductors 10 and 11 are further insulated by a cloth sheath (not shown) and a braided wire sheath 12 to form the cable A. A similar cable B includes insulated conductors 14 and 15 which are protected by a metal sheath 16. The cables A and B may be heating cables such as described in U.S. Pat. No. 3,331,946 issued to Bilbro, for use in electrically heating pipes and other members.

In providing a cable such as A for heating or other purposes, it is necessary to join conductors 10 and 11 in a termination connection T. First, the insulation 10a and 11a is removed from the ends 10b and 11b of the conductors 10 and 11 and the exposed ends are joined together by soldering or other suitable means.

A bottom insulation member 20, which is basically cylindrically shaped, includes a shoulder 20a which provides a flat face 20b having a V-shaped groove 21 therein corresponding to the V-shape of the joined conductor ends 10b and 11b. The bottom insulation member 20 is placed underneath the joined conductor ends 10b and 11b such that the conductor ends 10b and 11b fit substantially in the V-shaped groove 21 in the face 20b.

A top insulation member 22 has a V-shaped groove 23 on the bottom face 22a thereof. The V-shaped groove 23 is matched with the V-shaped groove 21 of the bottom insulated member 20 such that when the top insulating member 22 is lowered into place upon the face 20b of the bottom insulating member 20, the V-shaped joined conductors 10 and 11 are positioned within the grooves 21 and 23. The arcuate outer wall 22b of the top insulation member 22 cooperates with the outer wall 20c of the bottom insulation member 20 to provide a substantially cylindrical insulation member.

With the top insulating member 22 in place upon the bottom insulating member 20, a sealant 24 such as Dow Corning "Silastic" is spread over the outer walls 22a and 20c of the top and bottom insulating members 22 and 20, respectively, and a cylindrical metal sleeve 25 of aluminum, steel, copper of similar metal, which is closed at 25a to form a cap, is then slidably mounted thereover. The use of the sealant 24 such as Dow Corning "Silastic" allows the cap 25 to be slidably mounted over the insulating members 20 and 22 more easily; thereafter, the sealant hardens to secure the insulating members 20 and 22 in the sleeve 25. The sealant 24 may also be a silicone or some type of epoxy or any other material which will act as a lubricant when first placed on the outer walls 22a and 20c of the insulating members 22 and 20 and will harden after the sleeve 25 has been placed over the insulating members.

The V-shaped grooves 21 and 23 in the insulating members 20 and 22, respectively, receive and contain not only the V-shaped joined exposed conductor ends 10b and 11b but also, receive insulated portions of the conductors. The positioning of portions of the conductors 10 and 11 which are insulated by the rubber insulator 10a and 11a in the V-shaped grooves 21 and 23 further secure the conductors 10 and 11 in the grooves 21 and 23 because the insulated portions fit very snugly therein.

After the cap 25 has been mounted over the insulating member 22, the cap 25 is annularly crimped at the end 25b thereof and at places such as 25c and 25d intermediate between the crimped end 25b and the closed end 25a. The annular crimping of the metal cap serves to lock the insulating members 20 and 22 together and thus further secure the joined conductor ends 10b and 11b therein. The crimping of the cap 25 at the end 25b helps to prevent any movement of the portions of the conductors 10 and 11 which are positioned in the grooves thereby helping to prevent the dislodging of the conductors 10 and 11. Also, the metal cap 25 is so effectively secured with the insulating members 20 and 22 that it is virtually impossible to inadvertently disassemble the connection.

The insulating members 20 and 22 may be made from polytetrafluorethelyne sold under the trademark "Teflon" or any other suitable deformable insulation material which effectively insulates the conductors 10 and 11 to prevent their being shorted out by contacting an external ground connection or the like, and to also protect individuals from electrical shock when handling the termination connection T.

The termination connection T is designed to protect and insulate joined conductors such as 10 and 11 which are connected together to provide the termination connection for an electrical loop. It is also necessary on many occasions to provide a connection C for connecting cable B to cable A in order to continue a conductor length. First, exposed ends 10c and 11c of the conductors 10 and 11 are spliced, bonded or otherwise joined with the exposed ends 14a and 15a of conductors 14 and 15 of the cable B. With the conductor ends 10c and 11c joined to the conductors 14a and 15a, respectively, the cable B is electrically connected to the cable A to provide a continuation thereof for the purposes of transmitting electricity. However, it is necessary to thoroughly insulate the exposed conductor ends 10c, 11c, 14a and 15a.

A bottom insulating member 30 includes an arcuate outer wall 30a and parallel grooves 31 and 32 in the upper face 30b thereof. Similarly, an upper insulating member 33 includes an arcuate outer wall 33a and a lower face 33b having parallel grooves 35 and 36 therein. The parallel grooves 35 and 36 in the lower face 33b of the top insulating member 33 are positioned to align with the parallel grooves 31 and 32 in the face 30b of the bottom insulating member 30 when the insulating members are placed on opposite sides of the connected conductor ends 10c and 14a and 11c and 15a. Specifically, the bottom insulating member 30 is placed against the bottom side of the joined conductor ends 10c and 14a and 11c and 15a and thereafter the top insulating member 33 is placed upon the top side of the joined conductor ends with the faces 33b and 30b of the insulating members in substantial engagement with each other. In such position, the conductors 11 and 15 are positioned in the grooves 31 and 36 and the conductors 14 and 10 are positioned in the grooves 32 and 35 such that the exposed portions thereof are prevented from being moved into engagement with each other in order to prevent any short-circuiting thereof.

The sealant 24 is then spread over the outside surfaces 33a and 30a of the insulating members 33 and 30, respectively, and a sleeve 37 is slidably mounted over the joined or attached insulating members 30 and 33 in order to maintain the insulating members into firm engagement. The sealant 24 serves to further secure the metal sleeve 37 in position about the joined or fastened insulating members 30 and 33.

The sleeve 25 is annularly crimped at various points such as 38, 39, 40, 41 along the length thereof and at 42, which is the end of the sleeve 25. As previously mentioned and with respect to cap 25, the annular crimping of the sleeve 37 serves to insure that the connection C cannot be inadvertently disassembled.

The cap 25 and the sleeve 37 have both been disclosed as being cylindrical in shape; however, it is within the scope of this invention to utilize other shapes of sleeves or caps such as 43 which is illustrated in FIG. 3. In FIG. 3, the insulating members such as the top insulating member 44 and the bottom insulating member 45 cooperate when placed about conductors such as 46 and 47 to provide a triangular shape for receiving the triangular shaped sleeve 43.

It is to be understood that it is within the scope of this invention to utilize such connectors as the termination connector T or the connection C with other types of conducting systems than the heating cables A and B discussed herein. It is to be further understood that the top and bottom insulating members such as 20 and 23 may be made of materials other than "Teflon" as long as good insulation is provided. It has been mentioned that sealants other than "Silastic" by Dow Corning may be utilized and other materials than metal may be used to make the caps 25 or the sleeves 37. Further, the configuration of the sleeves 37 or the cap 25 may be varied from the cylindrical shape of FIGS. 1-2 and the triangular shape of FIG. 3.

It is to be appreciated that the connectors of this invention consist of inexpensive elements and that the time for installation of either of the connectors T or C discussed herein is actually quite minimal in comparison to the sturdiness and effectiveness of the connectors.

The inner diameter of the cap 25 may be greater than or substantially equal to the outside diameter of the joined insulated members 20 and 22; if the inner diameter of the cap 25 is larger than that of the joined insulation members 20 and 22, the sealant 24 acts to seal the space between the members 20 and 22 and the cup 25. Similarly, if the inner diameter of the sleeve 37 is greater than the outer diameter of the joined insulation members 30 and 33, the sealant 24 acts to seal the space therebetween. Although the members 20 and 22 are disclosed as separate members, it should be understood that they may be physically attached or formed together so long as they may be opened or hinged to an open position to expose their respective grooves 21, 23 to receive the wires 10b, 11b. The same comment also applies to the members 30, 33.

The foregoing disclosure and description of the invention are illustrative and explanatory thereof, and various changes in the size, shape and materials as well as in the details of the illustrated construction may be made without departing from the spirit of the invention.

I claim:

1. An insulator enclosing an electrical connection of first and second electrical conductors, each of said electrical conductors including an electric wire portion surrounded by insulation, said insulation being removed from the end of each of said first and second conductors to provide exposed wire ends, said exposed wire ends being electrically joined in a substantially V-shape comprising:

a first deformable insulation member having grooves therein in a substantially V-shape to conform to said joined wire ends;

a second deformable insulation member having grooves in a substantially V-shape conforming to said grooves in said first insulation member;

said first and second insulating members assembled about and positioning said joined wire ends in said V-shaped grooves of said first insulation member and in said V-shaped grooves of said second insulation member;
a sleeve mounted about said first and second insulation members; and
said sleeve being annularly crimped to said insulation members mounted in said sleeve and deforming said insulation members for locking said sleeve and said insulation members about said joined wire ends of said first and second electrical connectors.

2. The structure set forth in claim 1, including:
a sealing compound disposed between said insulation members and said sleeve to seal the space therebetween.

3. The structure set forth in claim 1, wherein:
said sleeve is crimped near one end thereof.

4. The structure set forth in claim 1, wherein:
the assembled shape of said first and second insulating members is cylindrical and wherein
said sleeve member is cylindrically shaped.

* * * * *